(No Model.)

W. B. HOLLINGSHEAD.
STORAGE BATTERY.

No. 436,602. Patented Sept. 16, 1890.

WITNESSES:

INVENTOR:
Wm. B. Hollingshead.
By A. P. Thayer.
atty.

UNITED STATES PATENT OFFICE.

WILLIAM B. HOLLINGSHEAD, OF BRONXVILLE, ASSIGNOR OF ONE-HALF TO SYDNEY H. CARNEY, OF NEW YORK, N. Y.

STORAGE-BATTERY.

SPECIFICATION forming part of Letters Patent No. 436,602, dated September 16, 1890.

Application filed December 20, 1889. Serial No. 334,406. (No model.)

*To all whom it may concern:*

Be it known that I, WILLIAM B. HOLLINGSHEAD, a citizen of the United States, and a resident of Bronxville, in the county of Westchester and State of New York, have invented new and useful Improvements in Storage or Secondary Batteries, of which the following is a specification.

The accompanying drawings represent, in three sectional elevations, an accumulator or storage battery as it may be arranged in as many different forms in accordance with my invention.

One element $a$ consists of red lead and the other $b$ of metallic iron, with an electrolyte consisting of potassium sulphide or other acid salt, as potassium cyanide or potassium bichromate or any salt which during charging would be decomposed into its acid and alkaline constituents.

Figure 1:
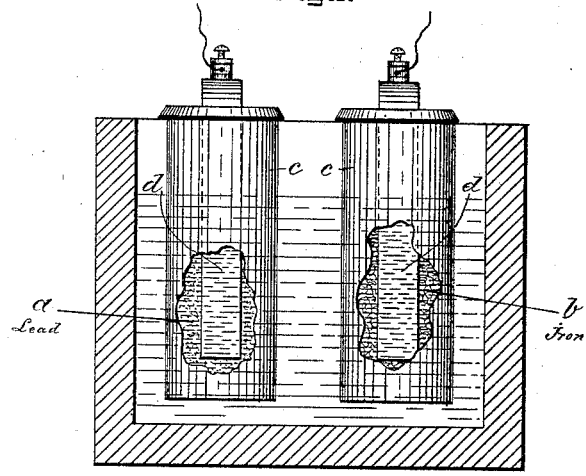
Figure 2:
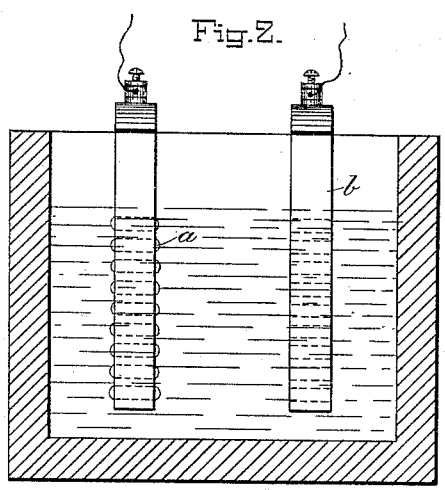
Figure 3:
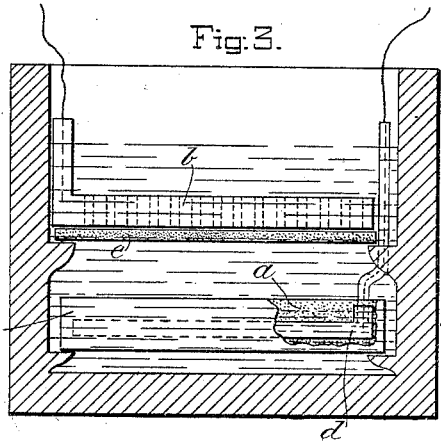

In Figure 1 I represent both the red lead and the iron elements in porous cups $c$, with conductors $d$ of carbon or iron, or any other substance not affected by the electrolyte. In Fig. 2 I represent two iron plates, which may be used with this electrolyte, both having cells, and one charged with red lead; and in Fig. 3 I represent the red lead $a$ in a porous cup $c$ in the lower part of the jar, with an iron plate above having cells, with an intermediate porous plate $e$, with a conductor $d$ in the red lead.

I may use iron scales instead of the plate.

In charging, the red lead should act as the cathode and the iron as the anode.

When the cell is fully charged for reverse action we have for the cathode a plate of sulphide of iron and an anode of litharge with caustic potash in solution as an electrolyte. The hydrogen from the cathode reduces the sulphide of iron to the metallic state, producing sulphohydric acid, which is taken up by the caustic potash, producing potassium sulphide and water. The oxygen at the anode oxidizes the litharge to peroxide. This reaction takes place until the elements $a$ $b$ have resumed original relations.

I claim as my invention—

In a secondary battery, the combination, with a red-lead cathode and an iron anode, (in charging,) of an electrolyte composed of water and a salt which during charging will be decomposed into its acid and alkaline constituents, and whereof the alkali remains in solution and acts as an electrolyte during reverse action, while the acid is decomposed and deposits on or combines with the anode, or both, producing a compound insoluble in the electrolyte, acting as the cathode during reverse action.

In testimony that I claim the foregoing as my invention I have signed my name, in presence of two witnesses, this 2d day of December, 1889.

WM. B. HOLLINGSHEAD.

Witnesses:
A. P. THAYER,
W. J. MORGAN.